United States Patent [19]
Buerkle et al.

[11] Patent Number: 5,099,421
[45] Date of Patent: Mar. 24, 1992

[54] VARIABLE LENGTH PIPE OPERATIONS SEQUENCING

[75] Inventors: Daniel J. Buerkle, Newark Valley; Ngai, Agnes Y., Endwell, both of N.Y.

[73] Assignee: International Business Machine Corporation, Armonk, N.Y.

[21] Appl. No.: 292,292

[22] Filed: Dec. 30, 1988

[51] Int. Cl.⁵ .............................................. G06F 9/38
[52] U.S. Cl. .................. 395/375; 364/231.8; 364/263; 364/948.34; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,399,507 | 8/1983 | Cosgrove | 364/200 |
| 4,454,578 | 6/1984 | Matsumoto | 364/200 |
| 4,476,525 | 10/1984 | Ishii | 364/200 |
| 4,532,589 | 7/1985 | Shintani et al. | 364/200 |
| 4,613,935 | 9/1986 | Couleur | 364/200 |
| 4,658,354 | 4/1987 | Nukiyama | 364/200 |
| 4,750,112 | 6/1988 | Jones | 364/200 |
| 4,789,925 | 12/1988 | Lahti | 364/200 |
| 4,811,214 | 3/1989 | Mosenchuck et al. | 364/200 |
| 4,858,113 | 8/1989 | Saccardi | 364/200 |
| 4,890,218 | 12/1989 | Bram | 364/200 |

Primary Examiner—Gareth D. Shaw
Assistant Examiner—Brian L. Klock
Attorney, Agent, or Firm—Blaney Harper; Maurice H. Kiltzman; John D. Crane

[57] ABSTRACT

A sequence of instructions made up of stages is executed sequentially by the processor in a first mode (stack mode) such that, the Nth stage of the Ith instruction is processed simultaneously with the N+1 stage of the I−1 instruction. Similarly the N+1 stage of the I−1 instruction is processed at the sasme time as the N+2 stage of the I−2 instruction and so on. The processing unit maintains the execution of instructions in the same sequence as they were received by the processing unit by executing all sections of an instruction. Even though a stage may not be required for execution of a particular instruction, the processor must wait (i.e., execute a null instruction) for a time equivalent to a stage before processisng the next stage. The invention provides a second mode (non-stack mode) of execution such that unneeded or null instruction stages are bypassed without the processing order of the execution sequence being disturbed. Sequence logic determines the conditions necessary for a sequence of instructions to be executed in one or the other modes of execution. The processor switches back and forth between stack mode and non-stack mode of processing in order to keep the instructions executing in the same order as they are received by the processor. The non-stack mode of execution allows the processor to utilize wasted time and improve the performance of the processor while the stack mode avoids the need for complex and expensive logic to keep track of out of order instruction processing.

39 Claims, 5 Drawing Sheets

| Cycle # | 1 | 2 | 3 | 4 | 5 | 6 | 7 | 8 | 9 | 10 |
|---|---|---|---|---|---|---|---|---|---|---|
| Sect. | I | R | A | D | F | E | W | | | |
| RR | | | | | | | | | | |
| Sect. ST | | I | R | R* | R* | R* | A/E | D | S | |
| Sect. Next I | | | I | I* | I* | I* | R | A | D | F.. |

| Cycle # | 1 | 2 | 3 | 4 | 5 | 6 | 7 | 8 | 9 |
|---|---|---|---|---|---|---|---|---|---|
| Sect. | I | R | E | W | | | | | |
| RR | | | | | | | | | |
| Sect. ST | | I | R | A/E | D | S | | | |
| Sect. Next I | | | I | R | A | D | F ...... | | |

* Denotes null operation

FIG. 5

VARIABLE LENGTH PIPE OPERATIONS SEQUENCING

BACKGROUND OF THE INVENTION

1. Field of the Invention

The present invention relates generally to the field of general purpose digital computers and to methods and apparatus for high speed instruction processing. More particularly, the invention relates to pipeline processing control of hardwired instructions.

A general purpose digital computer processes a group of instructions which are received, in sequence, from a storage unit of the computer. The instructions processed or executed by the processor of the computer can be organized depending on whether or not a particular instruction depends on microcode for its execution. Instructions that do not depend on microcode, called hardwired instructions, are executed solely through hardware in the computer and perform the most basic functions of the computer. One method of processing hardwired instructions is to execute them serially, one starting after a preceding instruction has finished. This normally wastes a significant amount of the available computer hardware because most of the hardware sits idle as the instruction is passed from one part of the computer to the next in its execution. Another method of processing recognizes that the processing of each instruction within a sequence involves several different stages. Several stages can be processed simultaneously if each stage, by itself, can be processed independently of the other stages within the processor. This results in the first stage of one instruction being executed by the processor immediately following the execution of the first stage of a previous instruction while, at the same time, the execution of the second stage of the previous instruction takes place. In general for a K stage pipeline, the Nth stage of an instruction is executed following the Nth stage of the previous instruction and the N+1 through the last stages of the previous K-N instructions are executed simultaneously with the Nth stage of the current instruction.

These stages of hardwired instructions generally include, among others, routing the instruction to the proper device for reading and decoding the instruction, reading and decoding the instruction, obtaining any information required by the instruction for further processing, executing the instruction, and routing the results of the execution to the proper devices to act on the results. All the stages are performed in the same duration of time, so that although some stages may execute faster than others, stages are performed in the same duration of time, so that although some stages may execute faster than others, the stage with the longest processing time sets the time duration for all the stages. Each stage is unique in that its execution only requires a part of the computer apparatus not used by the other stages. This means that, as an instruction moves through each stage, the other parts of the computer not associated with the individual stage are free to operate on other instructions. The instruction stage may depend on the output of other stages for its input so that its execution may not be completely independent from other stages, however, once the inputs to a particular stage are available, the execution of the instruction with those inputs is independent of other stages. Therefore, it is possible for all the different stages to be executing simultaneously and in turn process several instructions simultaneously instead of serially. This method will waste less of the available computer hardware and take less time to process a sequence of instructions in order.

This segmentational approach to processing instructions is referred to as pipelining and is described, for example, in an article by D. W. Anderson, F. J. Sparacio, and R. M. Tomasulo entitled "The IBM System/360 Model 91: Machine Philosophy and Instruction Handling", IBM Journal of Research and Development, Vol. 11, No. 1, pp. 8-24, January 1967. Since different sections of consecutive instructions are carried out simultaneously the computer throughput is improved. The term "performance" is synonymous with the term "throughput"; it is measured by recording the number of instructions-per-cycle, that is, the number of instructions completed in one machine cycle. The measurement is an average number produced when a batch of instructions or a program is processed in the processor. It is the inverse of the number of machine cycles it takes to complete a batch of instructions or a program. The smaller number of machine cycles per program the better the performance or throughput.

The particular pipeline structure used for executing hardwired instructions in a computer is very dependant upon the way in which the hardware in the computer is designed to operate. Typically, higher performance machines use separate parts of the computer for specialized requirements, such as having one part of the computer only doing a small piece of an instruction but doing it very fast, or accessing memory in the computer by a specific calculation technique requiring separate or different instruction stages. This will make the computer have higher throughput but will also generally make the individual instruction go through a larger number of stages. The increased number of stages coupled with the fact that a large number of hardwired instructions do not require all the stages in the execution of a particular instruction, means that even though the throughput is improved there is still a significant amount of computer hardware not being used at any one time. This is because when a particular pipeline structure is used, the instruction must execute all the stages of the instruction, regardless of whether or not the stage actually provides a function required by the instruction. This results in the processor standing idle for the full time associated with one stage of an instruction because each stage is allocated the same amount of processor time regardless of the actual execution time of the stage. The idle time of the processor in one instruction ripples through the execution of a sequence of instructions because the simultaneous processing of instructions requires that the Nth stage of a current instruction not start execution until the Nth stage of the preceding instruction has completed execution. Therefore, if the idle time of the processor associated with one instruction delays the Nth stage of a preceding instruction it will also delay the Nth stage of the current instruction and so on throughout the processing of the sequence of instructions. Delays in the execution of stages will continuously add up in this fashion until they become a significant factor in the performance of the processor.

2. Prior Art

The prior art has attacked the idle processor time problem, of pipelined processors, in a variety of ways. One such attack involves a pipelined processor which divides the decoding of each instruction into an operation decode and an operand specifier decode. The processor then decodes an operation and an operand part of an instruction in every decode stage, decoding subsequent operand parts of instructions when the current instruction does not require an operand decode. This method of processing instructions requires duplicate sets of hardware in order to fetch and buffer for use the two parts of the instruction. In addition, this method only contemplates saving time associated with fetching data from memory and does not address the problem of how to save time associated with executing the operation stages of the instructions. Another method of reducing idle processor time involves the sequential processing of a specific two instruction combination, for loading an execution result into an address of main memory, which then is executed in fewer stages than would be required in a conventional pipeline structure. Although the specific two instruction combination does appear repeatedly, there are many more combinations of instructions that waste execution stages. A particular solution to one such combination does not address the larger, general problem, of how to remove wasted stages in many different instruction combinations.

Another prior method reduces idle processor time by allowing the execution of the instruction fetch and address preparation stages of the pipeline to overlap. Here, the second instruction fetch section of a two instruction sequence (each instruction including both fetch and preparation stages) will be executed faster because the processor will not need to wait as long for the second instruction fetch stage, of the two instruction sequence, to complete execution. This method of instruction processing requires additional state logic to control and keep track of what instructions are at what stage of processing because as fetch or address preparation stages overlap in execution, the processor may or may not have the operands necessary to perform the current instruction. The additional state logic hardware is an unnecessary and complex burden which also does not address the problem of processor utilization when the instruction does not need to have an address preparation stage.

Another prior art attempt to reduce processor time used two fixed pipeline structures, one for the instruction processing and one for instruction execution. The system employs pipeline control circuitry to gate instructions through the different stage of each pipeline. The two pipelines are each three stages long with one stage overlapping between the two pipelines. This requires that there will be five stages between the two pipelines and therefore the combined pipeline structure displays the inefficiency of a single, fixed structure, pipeline.

Improving processor performance implies saving unnecessary machine cycles, if those cycles were merely bypassed altogether, then processor performance would be enhanced. This, however, would produce two problems; 1) different instructions would have different pipeline lengths and 2) some instructions would finish processing out of the order of the sequence in which they started processing. The first result of bypassing stages requires the determination of which particular instructions will have stages bypassed and what conditions in the computer hardware will generate different pipeline lengths for different instructions. In addition, the second result is because shorter pipelength instructions would take less time to execute than longer pipelength instructions and so that even if they started executing later than the longer pipelength instructions, they could still finish earlier. The second result of processing instructions in a way that results in an out of order sequence requires a significant increase in the complexity and amount of hardware used in the computer in order to keep track of what instruction is at what stage of execution and what information each instruction needs at each stage. Such complexity is not justified or possible to be handled by many systems.

SUMMARY OF THE INVENTION

It is therefore the object of this invention to improve the high speed method and apparatus of processing a sequence of hardwired instructions in a computer.

It is a further object of this invention to process instructions in order while modifying the pipeline structure of the instructions.

It is still a further object of this invention to delay a section of an instruction, bypass a section of an instruction, or delay an entire sequence of instructions depending on the instruction currently being executed, the current data storage requirements of the data processing system, and the potential conflict conditions within the data processing system, in order to provide in-sequence processing, improve processor performance, and minimize computer hardware requirements.

It is still a further object of this invention to provide a method of processing hardwired instructions in which a plurality of instructions have a plurality of pipeline structures and the pipeline structure used to execute a particular instruction depends upon the present and past instructions being executed, present storage requirements of the instructions being executed, and present storage capability of the data processing system.

It is still a further object of this invention to process hardwired instructions so that the time interval for executing a part of an instruction is constant for all parts of the instruction and so that different time intervals for executing different parts of separate instructions are synchronous and do not overlap.

It is still a further object of this invention to process hardwired instructions so that the number of sections of an instruction, that must be processed for all instructions, is not fixed and so that the pipeline structure in which an instruction will be executed is determined when the instruction is decoded.

It is still a further object of this invention to process a plurality of sequences of hardwired instructions in which the pipeline structure of each instruction is modified while a sequence is being executed.

The processing unit of the Data Processing System in this invention executes a plurality of hardwired instructions in stack or non-stack mode. The processing unit provides the sequence control logic to switch the execution mode between stack and non-stack mode, and also provides for the actual execution of the instruction. The processing unit determines not only when instructions are ready to be executed and in what pipeline mode they are to be executed, but it also facilitates the execution of the instructions. Each hardwired instruction executed by the processor is divided into a plurality of sections, typically comprising: 1) Instruction Fetch; 2) Opcode Decode and Read General Purposed Registers/Local Store (GPR/LS); 3) Storage Address Calculation; 4) Translation Lookaside Buffer, Directory and Cache Access; 5) Data Bus Activity; 6) Execution; and 7) Update GPR/LS.

A sequence of instructions made up of these stages is executed sequentially by the processor in a first mode (stack mode) such that, the Nth stage of the Ith instruction is processed simultaneously with the N+1 stage of the I-1 instruction. Similarly, the N+1 stage of the I-1 instruction is processed at the same time as the N+2 stage of the I-2 instruction and so on. The processing unit maintains the execution of instructions in the same sequence as they were received by the processing unit by executing all sections of an instruction. Even though a stage may not be required for execution of a particular instruction, the processor must wait (i.e., execute a null instruction) for a time equivalent to a stage before processing the next stage. The invention provides a second mode (non-stack mode) of execution such that unneeded or null instruction stages are bypassed without the processing order of the execution sequence being disturbed. Sequence logic determines the conditions necessary for a sequence of instructions to be executed in one or the other modes of execution. The processor switches back and forth between stack mode and non-stack mode of processing in order to keep the instructions executing in the same order as they are received by the processor. The non-stack mode of execution allows the processor to utilize wasted time and improve the performance of the processor while the stack mode avoids the need for complex and expensive logic to keep track of out of order instruction processing.

The first instruction of the sequence received by the processor is loaded into an instruction register and then decoded. If it requires data from the computer storage to complete the execution stage, the instruction is denoted to be RX type and is executed in stack mode, and if the instruction does not require storage data it is denoted RR type and may be executed in non-stack mode. If the first instruction of the sequence is RX type, the instruction is loaded into an instruction queue to wait for the data operands to be received from storage before execution. The second instruction in the sequence is then loaded into the IR, decoded, and if it also requires storage data, it is loaded into the instruction queue. When data operands are returned the instructions can be immediately sent to the processor for execution. When the first instruction in the sequence is RR type, the processor executes the instruction in non-stack mode which changes the pipeline structure of the instruction execution and bypasses those stages that are not required for execution. The time saved by the processor will ripple through subsequent instructions because they will not be backed up by waiting for non-executing stages to be processed. If the first instruction is an RX type and the second instruction is an RR type, the processor will execute the RR type instruction in the stacked mode of execution. This is so that the instruction sequence will finish execution in the same order as the instructions were received by the processor. The processor will also execute RR type instructions in stack mode when the processor detects that different instructions will create a conflict in using different computer resources. That is, for example, when two instructions require access to a single data bus at the same time. Switching the instruction execution back to stack mode when an instruction combination that creates this kind of conflict is detected by the processor will insure proper instruction priority for the computer resource.

BRIEF DESCRIPTION OF THE DRAWINGS

FIG. 5 is an illustration of a reduced pipeline structure.

DETAILED DESCRIPTION OF THE PREFERRED EMBODIMENT

Figure 1:
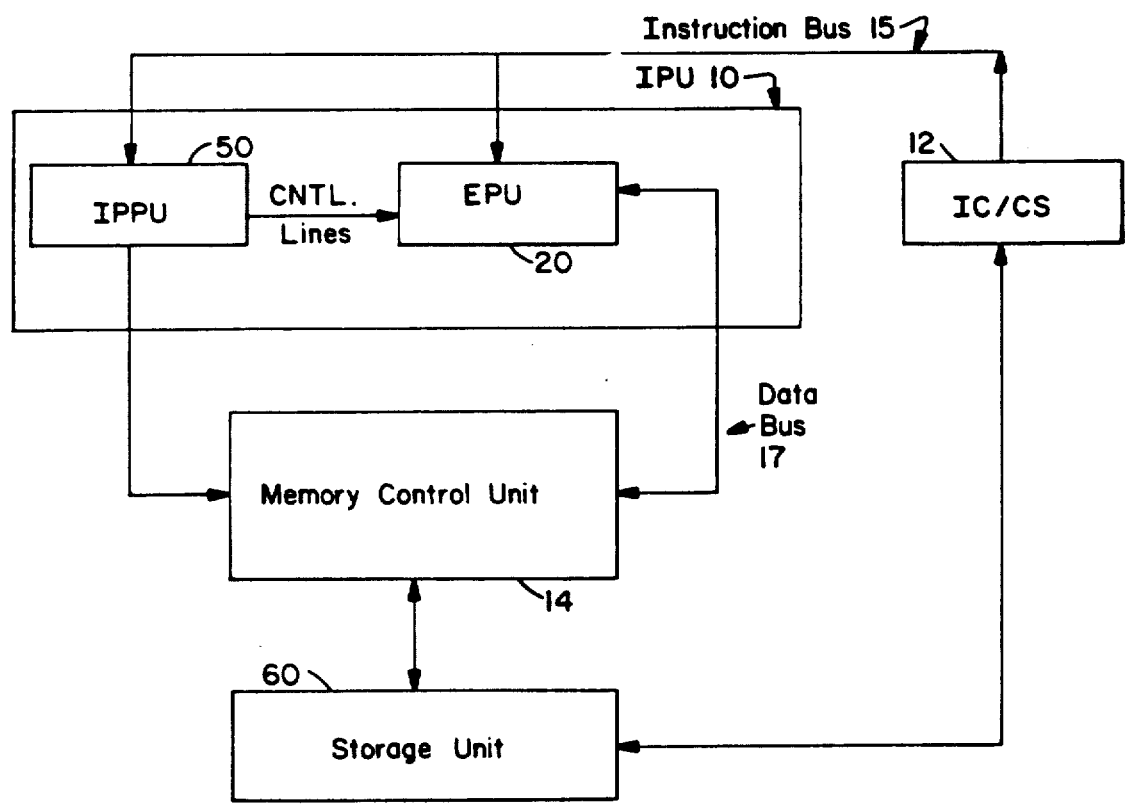
FIG. 1 is a block diagram of the Data Processing System.

A functional description of the data processing system of the invention is shown in FIG. 1, including its novel execution processing unit 20, hereinafter referred to as EPU, Instruction Pre-Processing Unit 50, hereinafter referred to as IPPU, and Instruction Processing Unit 10, hereinafter referred to as IPU, disposed therein, will be set forth in the following paragraphs with reference to FIGS. 1-5 of the drawings.

The IPU 10 of this invention as shown in FIG. 1 is composed of an IPPU 50 and an EPU 20. A sequence of hardwired instructions is received, by the IPU 10, from a storage unit 60 of a computer system via an instruction bus 15 and an Instruction Cache/Control Store unit 12. A data bus 17 supplies the EPU with stored data, requested by the instructions, from a storage unit 60 of the computer system through a Memory Control unit 14. The storage unit of the computer system supplying the instructions is not required to be the same storage unit that supplies the data to the EPU 20 and the IPPU 50. The EPU 20 is responsible for the execution of the instructions and the IPPU 50 is responsible for storage data operand requests, detection of conflicts and interlocks, and global pipeline controls associated with the execution of those instructions. Storage data operand requests refer to conditions where the IPPU 50 recognizes that an instruction will require data from the memory of the computer in order to execute the instruction and, therefore, generates signals in logic that will retrieve the data from memory. Detection of conflicts and interlocks is performed by logic which senses when different instructions will request access to the Data bus at the same time. Since the processor has only one Data bus, the IPPU 50 logic must decide which instruction gets priority to the bus. The IPPU 50 uses global pipeline controls to decide when to use the different pipeline structures for an instruction and by this mechanism alleviate execution problems with conflicts and storage data operand requests. Instructions executed by the IPU 10 of this invention are executed in the same order (in-sequence processing) as they are received by the IPU 10. In order to improve the performance of the IPU 10 while still maintaining in-sequence processing, the pipeline structure of the instruction being executed is varied in this invention to save machine cycles not necessary for the execution of a particular instruction.

Figure 2:
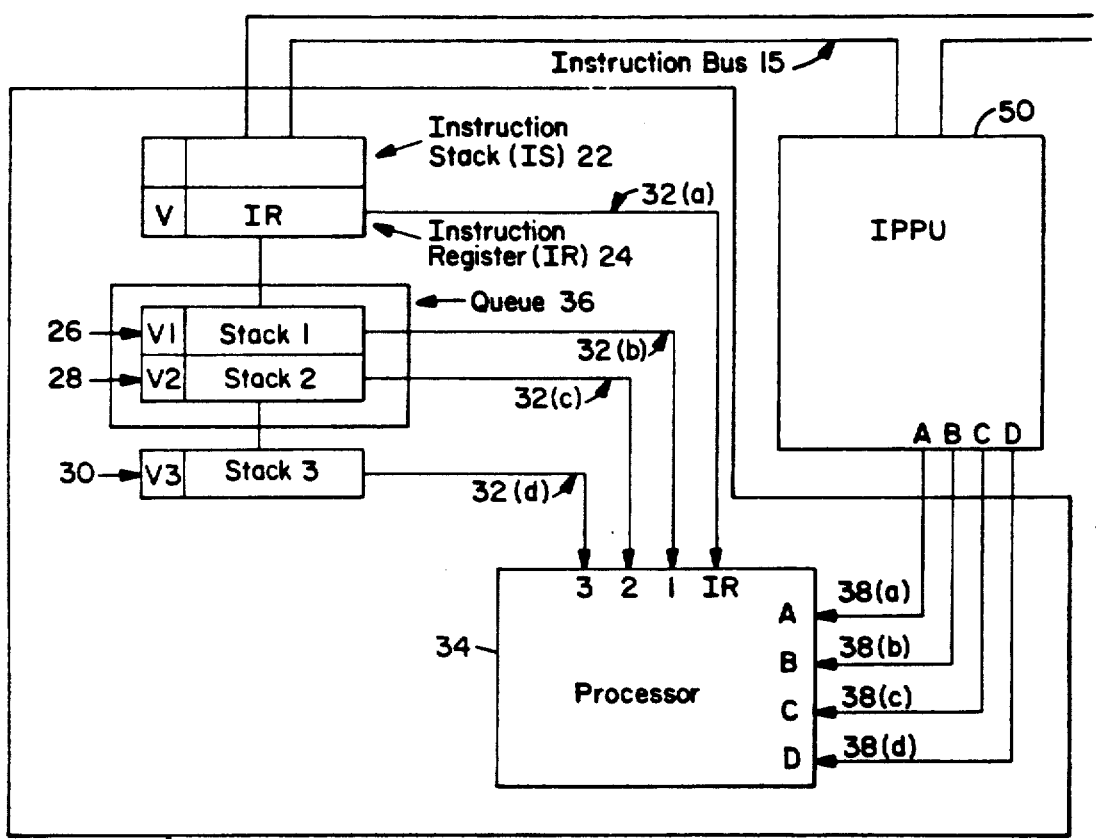
FIG. 2 is a block diagram of the components and control lines of the Execution Processing Unit, EPU, within the IPU.

A novel execution processing unit (EPU, 20) for carrying out the execution of instruction in the present invention, is illustrated by the following with respect to FIG. 2. In FIG. 2, the EPU 20 comprises an instruction stack (IS, 22) an instruction queue 36, a stack 3 (30), and a processor 34. The processor includes general purpose registers (GPRs), an arithmetic logic unit (ALU), a rotate merge unit (RMU), and condition code logic. The IS includes an instruction register (IR, 24) and is connected to an instruction bus 15 to receive an instruction from a sequence of instructions. The instruction queue (36) consists of stack 1 (26), and stack 2 (28), and is connected to the IR 24. An output (32(d)) is generated from stack 3 (30) representing an instruction to be executed in the processor. The instruction in stack 3 (30) is normally the one being executed. However, a separate output, 32 (a),(b), or (c) is also gated from the IR 24, stack 1 (26), or stack 2 (28) respectively. Therefore, any one of the instructions in the IR, stack 1, or stack 2 may be executed instead of the instruction in stack 3 (30).

Instructions are received in the EPU 20 directly from storage and are saved in the instruction stack IS 22. The IS includes an instruction register (IR, 24) to save (store) the instructions to be decoded and executed. Instructions, not executable until the required storage data is available, are saved (stored) in the instruction queue 36 (stack 1 and stack 2) until the operand and the execution logic are ready. The instruction queue is used to buffer the instruction preprocessing speed with the speed of execution of the processor 34. That is, if the processor is taking more time to execute an instruction than the IPPU is taking to determine various conditions of processing, then instructions whose preprocessing is complete will be placed in the queue so that the IPPU 50 can preprocess other instructions. The IR 24 includes a valid bit V. The valid bit is set to 1 by the instruction bus indicating that a valid instruction is being presented to the IR 24. Each of stacks 1-3 of the EPU also include a valid bit V1, V2, and V3. The valid bits V, V1, V2, and V3 designate whether the instruction is one requiring execution by the EPU 20. The valid bits help generate control signals A, B, C, and D (38 (a)-(d)), that designate which instruction is to be passed to the processor for execution. In FIG. 2, each separate output that appears from the IR 24, stack 1 (26), stack 2 (28), or stack 3 (30) of the instruction stack, may be executed directly when the respective control signal, A, B, C, or D, is set to one.

Figure 3:
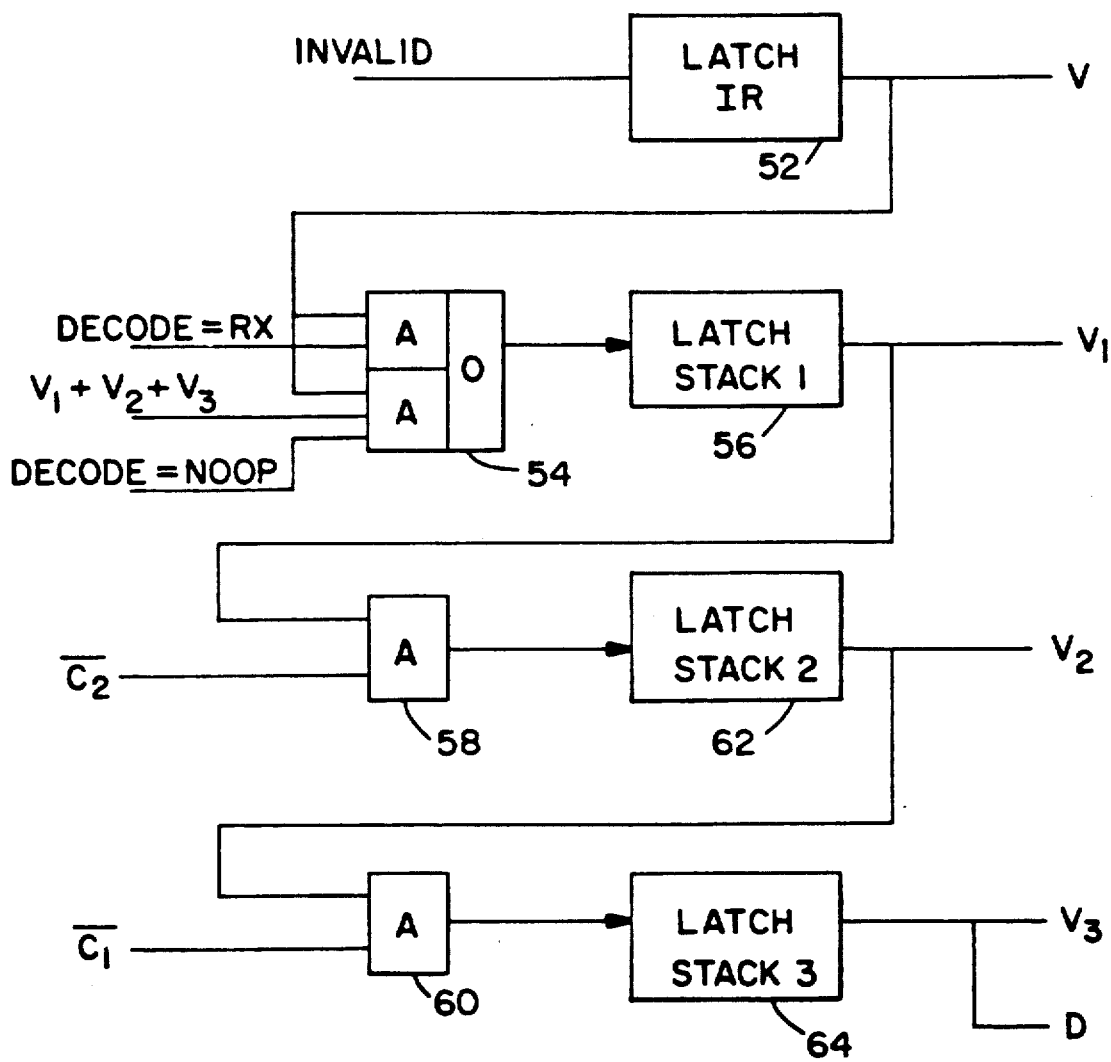
FIG. 3 is a diagram of the control logic used to generate the valid bits within the EPU.

The logic associated with transferring an instruction from the IR 24 to the instruction queue is shown in FIG. 3. The instruction from the instruction bus is latched, by a latch 52, into the IR 24 when the valid bit, V, is set. Valid bits V1, V2, and V3, are then generated and depend on the previous state of V1, V2, and V3, as well as the condition of control latches C1 (70) and C2 (72), whether the instruction in the IR 24 is an RR type instruction which does not require data from storage for its execution, and whether the instruction is a non-executable one (NOOP). The Valid bit is ANDed with a Decode=RX logic state. The valid bit is also ANDed with a Decode=NOOP logic state and the combination of valid bit 1 ANDed with valid bit 2 ANDed with valid bit 3. The output of the ANDed logic states are ORed to produce a single output, logic gate 54 in FIG. 3, to set the latch for stack one. If there are no previous instructions in stack 1, 2, or 3 (V1, V2, and V3 are all zero) when the current instruction in the IR 24 is valid, and the instruction is an RR type, a logic gate 54 will not latch the instruction into stack 1, by a latch 56, and V1 will remain at zero. If the instruction is an RX type instruction which requires storage data for its execution, the valid bit V1 will be set to 1 and the instruction latched into stack 1 by the latch 56. The valid bit V1 will then generate the valid bits V2 and V3 through AND logic gates 58 and 60, depending on the conditions of control latches C1 (70) and C2 (72). The instruction will then be passed from stack 1 to stack 2 through latch 62 and further to stack 3 (30) through latch 64 respectively as valid bits V2 and V3 are generated. When V3 is set to 1, the control signal D (38(d)) is also set to 1 and the instruction from stack 3 is passed to the processor.

Figure 4:
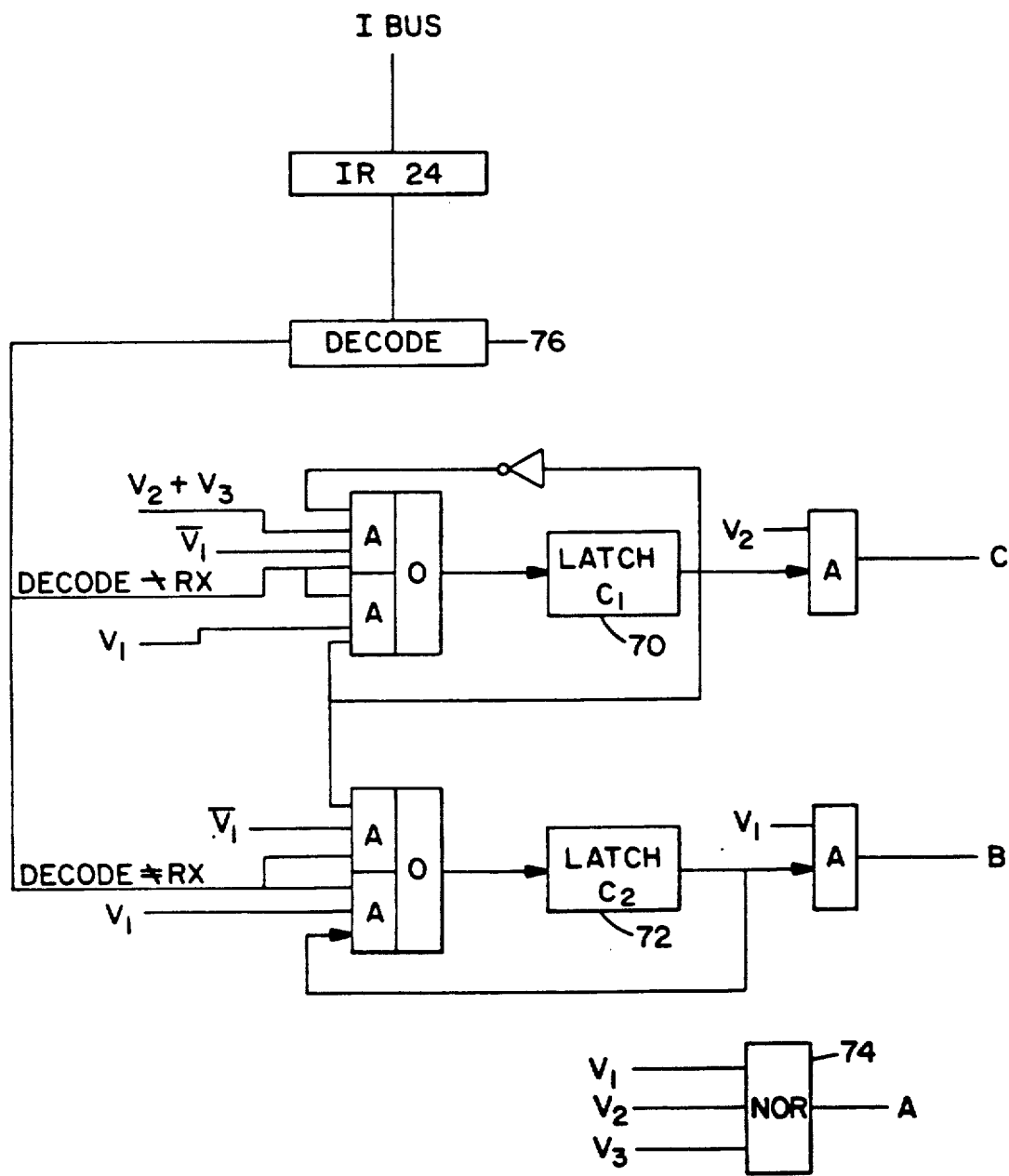
FIG. 4 is a diagram of the control logic used to gate instructions for execution within the EPU.

In FIG. 4, control latches are illustrated, for controlling the novel instruction stack of FIG. 4. Control latches C1 (70) and C2 (72) gate stack 2 (28) and stack 1 (26), respectively, to the processor 34. Control latches C1 (70) and C2 (72) are ANDed with valid bit 2 and valid bit 1 to generate control signals C and B respectively, which gate stack 2 (28) and stack 1 (26). Similarly, a NOR gate 74 receives the valid bits V1, V2, and V3 from stacks 1, 2, and 3 for generating control signal A (38(a)) and in turn gating the instruction from the instruction register IR 24 to the processor 34, when all valid bits V1, V2, and V3 are off (zero). This condition indicates that the queue 36 is not needed and the instruction is executed directly from the instruction register IR 24. When the instruction processing unit (IPU, 10) executes an instruction from the Instruction Register 24 in this manner the IPU 10 is said to be in non-stack mode, as opposed to being in stack mode when the instruction executed comes from the instruction stack (IS, 22). The state of control latches C1 (70) and C2 (72) also determine the states of the valid bits V2 and V3. Only after V1 has gone to "1" and the inverse of control latch C2 (72) has gone to "1", can the valid bit V2 be set to "1". Control latch C1 (70) has a similar effect on valid bit V3 after V2 has been set. In this manner the control latches C1 (70) and C2 (72) therefore make sure that an existing instruction in stack 2 (28) will not be overwritten by an instruction from stack 1 (26) and similarly that an instruction in stack 3 (30) will not be overwritten by an instruction from stack 2 (28).

The sequencing logic described above works in conjunction with the pipeline structure of the present invention to permit faster processing of hardwired instructions in the IPU 10. FIG. 5 shows an example of the reduction in pipeline structure as a result of this invention. Here the fixed pipeline structure of an RR-ST sequence is reduced from 9 cycles to 6 cycles in a variable pipeline structure processing mode. Global pipeline controls are logical signals sent from the IPPU 50 to the EPU 20 to regulate the processor's 34 execution of both i) which sections of an instruction are executed and ii) at what time, with respect to other sections of other instructions, are those sections of instructions executed. The IPPU 50 stores instructions processing status information as instructions are executed. This includes the status of past and present instructions in terms of what sections have been executed from what instructions. This also includes the present storage requirements of instructions currently being executed and when devices within the data processing system 2 will require bus access. The instruction processing status information is then used to generate, from logic, global pipeline controls that bypass executing some sections of some instructions or delay some sections or delay entire instructions.

The global control signals are denoted Hold IR, Stack Mode, and Hold Stack. The Hold IR control causes the IPU 10 to halt only the instruction currently in the decode section from advancing to the next stage of the pipeline. The remaining pipeline sections advance without any interference from this control. This control is activated when the control logic of the IPPU 50 detects that a potential conflict exists between the present instruction in the decode section and some previous but unfinished instruction. This arrangement will allow the previously started instructions to proceed in the pipeline execution and therefore resolve the conflict by allowing the earlier instruction to proceed uninhibited. The Stack Mode control serves two major functions. First, the control signal determines the mode of processing of the current instruction in the decode section of the pipeline. Logic within the IPPU 50 which monitors the EPU 20 and IPU 10 in general, sets this control signal which either processes an instruction through stack mode or non-stack variable pipeline mode. Second, the control signal explicitly controls the source of instructions for the execution section of the pipeline. The Stack Mode control signal determines if the instruction fed to the processor 34 is from the IR 22 or from the instruction queue 36 or stack 3 (30). For example, since RX instructions must be executed in Stack Mode, the decode of RX instructions sets state logic which activates the Stack Mode signal and therefore processes the instructions in stack mode. The Hold Stack control signal is used to convey sequence information to the EPU 20. This control signal stops the advancement of instructions in both the Instruction Stack 22 and the Instruction Register 24. It does not affect those instructions that have already left the Instruction Stack 22 and they are allowed to continue processing through completion. This signal is generally used when storage data is unavailable for an RX or an LD type instruction when that instruction has advanced to the execution section of the pipeline. Delaying or bypassing sections of instructions through these global control signals provides a variable pipeline structure for hardwired instructions. The use of global control signals in conjunction with sequencing logic of the IPPU 50 facilitates in sequence processing of hardwired instructions with a variable pipeline structure.

Operation

The standard pipeline structure used in the design of the IPU 10 of the present invention for a hardwired instruction is composed of 7 sections, each section being processed in a single execution time interval or machine cycle. Each execution time interval or machine interval is of identical time duration. The sections are executed in the following order:

| Cycle Number | 1 | 2 | 3 | 4 | 5 | 6 | 7 |
|---|---|---|---|---|---|---|---|
| Section | I | R | A | D | F | E | W |

Where
 I is Instruction Fetch
 R is Opcode Decode and Read GPR/LS
 A is Storage Address Calculation
 D is TLB / Directory and Data Cache Access
 F is Data Bus Activity
 E is Execution
 W is Update GPR/LS To achieve the maximum performance for the IPU 10, execution of a new hardwired instruction is started every machine cycle (in sequential instruction processing mode). The IPU 10 executes the instruction fetch section of the first instruction on the first cycle and then executes the Opcode decode and read GPR/LS (General Purpose Register/ Local Store) section of the first instruction on the second machine cycle. The processor can execute each instruction section independently of the other sections so that when the IPU 10 is processing the Opcode decode and read GPR/LS of the first instruction on the second machine cycle, the IPU 10 is free to process the instruction fetch section of a second instruction in the second machine cycle. This requires that the execution time intervals of sequential instructions are synchronous. This means that the end or beginning of the Kth execution time interval of an instruction is also the beginning of the K+1 execution time interval and the end of the K−1 execution time interval respectively. In addition, synchronous time intervals require that the end or beginning of any execution time interval of an instruction also be the end and beginning of execution time intervals of both previous and subsequent instructions. The IPU 10 can process subsequent instructions in this same assembly line fashion having the third instruction start processing on the start of the third machine cycle and so on.

The standard instruction requires at least 7 sections, however, not all hardwired instructions require execution of all of the above sections. Instructions may also require more stages if the instructions have to wait for data to be returned from storage. The present invention executes 126 different hardwired instructions, some of these are capable of utilizing either the standard pipeline structure or a pipeline structure which bypasses sections not required during the execution of the various instructions. The choice of when to use different pipeline structures depends on what type of instruction is to be executed. The instructions handled by the IPU 10 are first divided into categories depending on the hardware data flow needed to execute the instruction function. Some instructions, called RX type instructions, are not executable until the required storage data is available. RX instructions are saved in an instruction stack of the EPU 20 until the operands (storage data) and execution logic are ready and these instructions are only executed in the standard pipeline structure. Other instructions, called RR type instructions, are executed via the processor logic and do not need to wait for storage data, so that they can be executed faster and with fewer operations than RX type instructions and consequently can take advantage of a different pipeline structure.

Another group of instructions called load type (LD), do not require an execution stage but rather fetch storage data directly into a general purpose register of the processor 34. Execution of this type of instruction in non-stack mode provides that subsequent instructions do not need to wait for the LD instruction to finish its operation before subsequent instructions start executing unless the subsequent instructions require the data that the LD instruction is fetching. RR instructions that follow LD instructions could then be processed in non-stack mode because there is no need for the RR instruction to wait for data that it does not require. LD type instructions also are processed in stack mode when mixed with RX instructions. In this case the LD instruction is a null operation during the execution section of the pipeline so that the RX instructions avoid bus or other hardware conflicts.

A final group of instructions is characterized by the use of the storage address calculation stage (A) and execution (E) sections occurring simultaneously after the Opcode Decode and Read GPR/LS (R) stage. These instructions are different from other instructions because they transfer data from the IPU to a storage destination rather than to specific GPRs as in other instructions. This group can be further subdivided into two groups, a store (ST) group and a branch group. In the store group the data is transferred to a storage unit and requires a TLB/Directory and Data Cache Access cycle (D) and a Data Cache update cycle (S) following the A and E sections. The ST instruction pipeline is I R A/E D S and closely resembles RR type instructions in its operation. The only difference between RR and ST instructions is that because ST instructions send data to different places than RR instructions, different conflict conditions arise. Branch instructions also have a common A/E section, however because they provide the ability to change the instruction stream, an instruction fetch/instruction Cache Access section (I) and data bus transfer section (F) follow the A/E section. The Branch instruction pipeline is I R A/E I F. Branch instructions are similar to ST and RR type instructions in their pipeline structure with the major difference being that the instruction sends the data to instruction cache rather than data cache or designated GPRs.

The RR type instructions are provided with two pipeline structures, one for stack mode operation and one for non-stack mode operation. Stack and non-stack mode operation refer to the execution of instructions from an instruction stack or from an instruction register, respectively. The pipeline structure for RX type instructions is the same for non-stack mode operation and normally consists of 7 stages, assuming no waiting for data, as above. The pipeline structure for RR type instructions operating in stack mode is the same as that for RX instructions. However, the pipeline structure for RR type instructions operating in non-stack mode varies from 4 stages up to the number of stages used in the RX instructions. The pipeline structure is adjusted for each instruction so that functions which do not require some stages do not have to reserve, and therefore waste, time associated with those stages. In the present embodiment of the invention, this adjustment is made by allowing operands for RR instructions to be accessed in the same stage as the Opcode decode of that instruction. Operands for the RX instructions, by contrast, must be accessed through 3 additional stages that are not required by RR instructions which do not access storage data. This means that an RR type instructions that is executed in non-stack mode will execute faster than that RR instruction when it is executed in stack mode. Therefore, the overall improvement in the IPU 10 performance will depend on how many RR type instructions can be executed in non-stack mode and how many fewer pipeline stages the non-stack mode pipeline structure has compared to the stack mode version.

In order to retain in sequence execution of non-stack mode RR instructions and therefore maximize the IPU 10 performance with minimal hardware requirements, the invention provides sequence control logic to control global pipeline operation in the instruction preprocessing unit (IPPU, 50) for the execution of a sequence of instructions. Instructions are executed in the same sequence as they are presented to the IPU 10. However, RR type instructions following RX instructions can complete execution faster than RX instructions and give an incorrect execution order. The IPU sequence logic recognizes this problem and, therefore, loads RR instructions following RX instructions into the stack of the EPU 20 and processes them in stack mode with the standard pipeline structure. When all entries in the instruction queue are invalid (i.e., the valid bits are no longer set) the IPU 10 then is free to return to non-stack mode to process other RR instructions from the instruction register of the EPU 20 in the non-stack variable pipeline structure. The control logic also recognizes that an RX instruction can also compete with an RR instruction for access to the data bus or processor, causing a conflict. Attempting to process two execution (E) sections at the same time is one example of such a processor conflict. When the control logic detects such a sequence of instructions it delays the start of the second instruction by an appropriate number of cycles to avoid the delay. This technique wastes a minimal amount of time but avoids complicated hardware to arbitrate between the instructions for access to a particular part of the data processing system. In addition, even though an RR instruction may not require a data storage operand, its execution may still cause a potential IPU data bus 17 conflict. An example of such a problem is when the Update GPR/LS (W) section is attempting to use the Data Bus at the same time as the TLB/Directory and Data Cache Access (D) section. The sequence control logic recognizes such conflicts and returns the IPU 10 back to stack mode execution from non-stack mode whenever such conflicts occur. The IPU 10 will then execute the instruction with the standard pipeline structure and avoid the possibility of a conflict.

Conflicts also occur when either RX or RR type instructions are mixed with store or Branch instructions. When an RX is followed by an ST the following pipeline structure exists.

| Cycle # | 1 | 2 | 3 | 4 | 5 | 6 | 7 | 8 | 9 | 10 |
|---|---|---|---|---|---|---|---|---|---|---|
| Sect. | I | R | A | D | F | E | W | | | |
| RX | +— | +— | +— | +— | +— | +— | +— | +— | +— | +—+ |
| Sect. | | I | R | R* | R* | R* | A/E | D | S | |
| ST | +— | +— | +— | +— | +— | +— | +— | +— | +— | +—+ |
| Sect. | | | I | I* | I* | I* | R | A | D | F... |
| Next I | | | +— | +— | +— | +— | +— | +— | +— | +—+ |

*Denotes null operation

The processor 34 may only process one execution section of an instruction at a time. Therefore, the A/E section of the Store (ST) instruction must be delayed, by null operation sections, a sufficient number of sections to avoid attempting to process two execution sections at the same time. The three null decode sections of ST are necessary to empty the stack mode pipeline, leave the stack mode, and cause the EPU (20) to perform the execution section simultaneously with the IPPU storage address calculation section. This pipeline structure backs up the next instruction fetch section by three delay sections. However, it avoids the necessity of additional logic hardwire to resolve the conflict. Branch instructions have similar problems in this regard as ST instructions because the only difference in pipeline structure from ST instructions is after the common A/E section. These conflicts are eliminated with respect to RR instructions when the sequence logic provides a minimum pipeline structure for RR instructions followed by ST or Branch instructions as demonstrated by the following:

| Cycle # | 1 | 2 | 3 | 4 | 5 | 6 | 7 | 8 | 9 |
|---|---|---|---|---|---|---|---|---|---|
| Sect. | 1 | R | E | W | | | | | |
| RR | +— | +— | +— | +— | +— | +— | +— | +— | +—+ |
| Sect. | | 1 | R | A/E | D | S | | | |
| ST | +— | +— | +— | +— | +— | +— | +— | +— | +—+ |
| Sect. | | | 1 | R | A | D | F | ... | |
| Next 1 | | +— | +— | +— | +— | +— | +— | +— | +—+ |

In addition, the ability of the sequence logic to provide a variable pipeline structure instead of only a fixed pipeline structure, minimizes the impact of the number of delay sections associated with conflicts even if there is no way to completely eliminate them.

The sequence control provided by the IPPU 50 to the EPU 20 monitors the status of the IPPU 50 and the EPU 20 to select the pipeline structure of each instruction and on what machine cycle that instruction will start execution. Although the execution of the instructions must be in sequence, the selection of a reduced pipeline structure for specific instructions and an appropriate time of when to start the execution of the instruction by the IPPU 50 significantly improves the IPU 10 performance. The selection of the pipeline structure for any particular instruction will depend on the status of the EPU 20 at the time that the instruction will be executed. The selection of the pipeline structure at this time allows the IPU 10 to maintain in-sequence operation while avoiding conflicts as well as minimizing the wasted processor time.

An example which illustrates the use of variable pipeline structure is a load address (LA) instruction is followed by an RX instruction when the LA result is used in the address calculation of the RX instruction. The IPPU 50 will signal the EPU to process the LA instruction in non-stack mode because at the time the instruction is to be executed the IPPU 50 knows the LA instruction will not require any data from storage and that no previous instructions in the pipeline require data from storage. The uniform pipeline structure of LA followed by an RX instruction is:

| Cycle # | 1 | 2 | 3 | 4 | 5 | 6 | 7 | 8 | 9 | 10 | 11 |
|---|---|---|---|---|---|---|---|---|---|---|---|
| Sect. | 1 | R | A* | D* | F* | E | W | | | | |
| LA | +— | +— | +— | +— | +— | +— | +— | +— | +— | +— | +—+ |
| Sect. | | 1 | R | R* | R* | R* | A | D | F | E | W |
| RX | +— | +— | +— | +— | +— | +— | +— | +— | +— | +— | +—+ |

*Denotes null operation

Whereas the variable pipeline structure for LA followed by an RX instruction is:

| Cycle # | 1 | 2 | 3 | 4 | 5 | 6 | 7 | 8 |
|---|---|---|---|---|---|---|---|---|
| Sect. | 1 | R | E | W | | | | |
| LA | +— | +— | +— | +— | +— | +— | +— | +—+ |
| Section | | 1 | R | A | D | F | E | W |
| RX | | +— | +— | +— | +— | +— | +— | +—+ |

Examination of the uniform pipeline structure of this instruction sequence reveals that there are 3 dummy cycles in the RX instruction. This is because the address generation cycle of RX cannot be started until after the execution cycle of LA and therefore it takes 11 total machine cycles to complete this instruction sequence.

In the variable pipeline sequence, the A, D, and F sections are not needed for the LA instruction and therefore the structure of the pipeline can be reduced by 3 cycles. As a result the LA followed by RX sequence can also be reduced by 3 cycles.

In another example a fetch data instruction is followed by a store data instruction. In this case the start of execution is delayed one section so that there is not a potential bus conflict and therefore the invention avoids the necessity of using an expensive arbitration technique.

The variable pipeline structure is:

| Cycle # | 1 | 2 | 3 | 4 | 5 | 6 | 7 |
|---|---|---|---|---|---|---|---|
| Section | 1 | R | A | D | F | | |
| Fetch | +— | +— | +— | +— | +— | +— | +—+ |
| Section | | 1 | R* | R | A/E | D | S |
| Store | +— | +— | +— | +— | +— | +— | +—+ |

*Denotes null operation

If there was no null operation in the store instruction, the TLB and directory access section (D) of the fetch instruction would have been trying to use the data bus at the same time as the store instruction during its execution section. This would have caused a conflict that, given a uniform pipeline structure, would have resulted in a total of 7 machine cycles to complete the sequence of instructions (assuming a cost of 1 cycle to resolve the conflict by any arbitration technique). Delaying the start of the store instruction by one machine cycle as shown above while using a variable pipeline, also allows the sequence to be completed in 7 machine cycles yet without the extra hardware associated with the arbitration technique. The combination of avoiding the conflict by monitoring the status of the EPU 20 and IPPU 50 along with the use of a variable pipeline structure results in at least similar performance, even assuming a best case delay of one section for arbitration, with less cost and complexity.

The sequencing logic described with respect to the EPU 20 works in conjunction with the above dual pipeline structure to permit faster processing of hardwired instructions in the IPU 10 as demonstrated by the following example. A sequence of instructions comprises 3 non-stack mode instructions followed by LA followed by an RX type instruction followed by ST instruction. The IPU of the present invention will process the instruction in the following manner. The first LA instruction would be latched in the IR 24, the IPPU 50 would decode the instruction and determine that it does not require storage data and can use a shorter pipeline structure. The LA instruction will then be passed to the processor from the EPU because the control signal A would have been set to 1 due to the fact that the 3 previous instructions did not require processing in stack mode. The 3 previous instructions being processed in non-stack mode means that valid bits V1, V2, and V3 would have been set to 0 indicating that there were no valid instructions in stack 1, 2, or 3. After the first LA instruction is sent to the processor, the RX type instruction is latched into the IR 24. The IPPU 50 would decode the instruction and determine that this instruction needs storage data and therefore requires the full pipeline structure. The sequence logic would then latch the instruction into stack 1 and set the valid bit V1 to 1. After the RX type instruction is in stack 1, the ST instruction is latched into the IR and subsequently decoded. The IPPU 50 determines that this instruction may use the non-stack pipeline structure and so will process the instruction in non-stack mode. However the instruction in stack 1 must be processed before the instruction in the IR 24 so that in-sequence processing will be maintained. This is accomplished in the sequence logic because the control signal A will not be set to one until the valid bit V1 is reset to zero. After the LA instruction finishes processing, the control signal D is set to one through the combination of valid bits, latch conditions, and type of instruction information. The control signal D then sends the RX instruction in stack 3 to the processor. Once the RX instruction has gone to the processor, the ST instruction will be sent to the processor to be executed in its non-stack pipeline structure.

Having described the invention in the form of this particular embodiment it will be recognized by those skilled in the art that other embodiments are possible without exceeding the scope of this invention. For example more or less sections could be used in the definition of the stack mode pipeline structure, a greater or fewer number of hardwired instructions could be used by the data processing system, or more or different storage units or devices that could cause conflicts within the data processing system's resources for executing instructions, are all examples of different embodiments of the invention which are within the scope of this invention. The invention is not limited to the examples and embodiments described herein and those examples and embodiments were used for illustrative purposes only.

We claim:

1. A data processing system for executing a sequence of instructions in such a manner as to improve performance, said data processing system comprises;
    an execution processing unit for receiving said sequence of hardwired instructions,
    an instruction pre-processing unit for independently receiving said sequence of hardwired instructions,
    at least one storage unit for storing said sequence of hardwired instructions and from which said execution processing unit and said instruction pre-processing unit receive said sequence of hardwired instructions,
    an instruction bus connected to said execution processing unit,
    said instruction pre-processing unit, and said storage unit for carrying said sequence of hardwired instructions to said execution processing unit and said instruction pre-processing unit from said storage unit,
    a data bus connected to said execution processing unit for carrying storage data from said storage unit to said execution processing unit, said execution processing unit executing said sequence of hardwired instructions in conjunction with said storage data, said execution processing unit executing each of said sequence of hardwired instructions in a pipeline structure,
    said sequence of instructions comprising a first and second group of hardwired instructions, each instruction in said first group of hardwired instructions having a single pipeline structure, said second group of hardwired instructions having a plurality of pipeline structures,
    said single pipeline structure and said plurality of pipeline structures comprising a plurality of sections, each section being executed by said execution processing unit in a single section execution time interval, each of said plurality of pipeline structures comprising a different minimum number of said sections, said single pipeline structure having a minimum number of said sections,
    said executing processing unit having at least a stack and non-stack processing mode, said execution processing unit executing said sequence of hardwired instructions and said instruction pre-processing unit selecting a processing mode for each hardwired instruction in said second group, and
    said pipeline structure for each instruction executed minimizes total execution time for said sequence of hardwired instructions by eliminating unused sections of pipeline structure.

2. A data processing system as recited in claim 1, wherein;
    said first group of hardwired instructions being executed in conjunction with storage data, said storage data received by said execution processing unit from said data bus before said data processing system completely processes said sequences of hardwired instructions, said second group of hardwired instructions executed independently from said data bus,
    said execution processing unit executing said hardwired instructions from said first and second groups in said stack mode,
    said execution processing unit sequentially and concurrently executes each section of said sequence of hardwired instructions, and
    said execution processing unit executes each of said plurality of sections for each hardwired instruction in said sequence of hardwired instructions independently from all other sections and said execution processing unit executes different sections for each hardwired instruction during said section execution time interval.

3. A data processing system as recited in claim 2, wherein;
    said instruction pre-processing unit comprises means to generate global pipeline controls, said global pipeline controls including a Hold IR signal, a Stack Mode signal, and a Hold stack signal,
    said instruction pre-processing unit comprises means to send said global pipeline controls to said execution processing unit from said instruction pre-processing unit,
    said execution processing unit delays a hardwired instruction in a decode section of said pipeline structure when said execution processing unit receives said Hold IR signal,
    said execution processing unit executes a hardwired instruction in said stack mode when said execution processing unit receives said Stack Mode signal, and
    said execution processing unit delays said sequence of hardwired instructions before said sequence advances to said decode section of said pipeline structure when said execution processing unit receives said Hold stack signal.

4. A data processing system as recited in claim 3, wherein:
said instruction pre-processing means further comprises monitoring means for monitoring said execution processing unit, said data bus, said instruction bus, and said storage unit, and
said monitoring means detects conflicts of priority generated by said sequence of hardwired instructions.

5. A data processing system as recited in claim 4, wherein;
said execution processing unit finishes said execution of said hardwired instructions in a sequence identical
to said sequence of hardwired instructions received by said execution processing unit.

6. A method of processing hardwired instructions in a data proceeding system comprising:
receiving a sequence of hardwired instruction in an execution processing unit and an instruction pre-processing unit from a first storage unit through an instruction bus,
dividing said hardwired instructions into at least two groups after said execution processing unit receives said hardwired instructions, at least one of said groups having a requirement for storage data,
retrieving said storage data for at least one of said groups before said instructions are completely executed, and
a first execution step of executing a sequence of said plurality of hardwired instructions in a pipeline structure, said pipeline structure comprising a plurality of sections executed during a single section execution time interval, said plurality of hardwired instructing having a plurality of pipeline structures,
selecting a processing mode based on said sequence of hardwired instructions for each of said plurality of hardwired instructions,
a second execution step of executing said pipeline structure for each of said plurality of hardwired instructions having a minimum number of said sections, said minimum number of sections for each of said plurality of hardwired instructions being different for different sequences of hardwired instructions, and
eliminating unused sections of pipeline structure so as to improve said data processing system's performance by executing said minimum number of said sections of said hardwired instructions for said sequence of hardwired instructions.

7. A method of processing hardwired instructions in a data proceeding system, as recited in claim 6, further comprising:
a third execution step of executing each of said hardwired instructions from a first group and a plurality of hardwired instructions from a second group in a first processing mode,
dividing each of said hardwired instructions in said first processing mode into a plurality of sections, said division occurring after said execution processing unit receives said hardwired instruction, said pipeline structure of said first processing mode comprising said plurality of sections, said plurality of sections comprising an identical plurality for each of said hardwired instructions,
sequentially and concurrently executing each section of hardwired instructions in said first processing mode without processing any one of said plurality of sections from at least two hardwired instructions in said first processing mode during a section execution time interval,
a fourth execution step of executing one of said plurality of sections in said first processing mode during said section execution time interval, said execution section time interval of each of said plurality of sections comprising identical time duration, said execution time intervals for said plurality of hardwired instructions being synchronous,
a fifth execution step of executing each of said plurality of sections for each of said hardwired instructions in a said first processing mode,
a sixth execution step of executing a plurality of said hardwired instructions from said second group in a second processing mode,
dividing each of said hardwired instructions in said second processing mode into a plurality of sections, said pipeline structure of said second processing mode comprising said plurality of sections, said division occurring after said execution processing unit receives said hardwired instruction, said plurality of sections comprising different pluralities for different pluralities of hardwired instructions in said second group,
sequentially and concurrently executing a plurality of said sections in said second processing mode,
a seventh execution step of executing one of said plurality of sections from one of said plurality of hardwired instructions in said second processing mode during said execution section time interval, said execution section time interval of each of said plurality of sections comprising identical time duration, said execution time intervals for said plurality of said instructions being synchronous, and
an eighth execution step of executing said hardwired instructions in said pipeline structure so that said first processing mode requires a greater minimum number of said sections than said pipeline structure of said second processing mode of said sequence of hardwired instruction.

8. A method of processing hardwired instructions in a data processing system, as recited in claim 6, further comprising:
receiving said hardwired instructions from at least an instruction queue and an instruction register,
buffering said execution processing unit from said instruction pre-processing unit,
executing said instructions from said instruction queue in said first processing mode, and
executing said instructions from said instruction register in said second processing mode.

9. A method of processing hardwired instructions in a data processing system, as recited in claim 6, further comprising:
controlling said execution with global pipeline controls, said global pipeline controls comprising a Hold IR signal, a Stack Mode signal, and a Hold stack signal,
delaying a hardwired instruction in a decode section of said pipeline structure with said Hold IR signal,
switching between said first and second processing modes in said decode section of said pipeline structure with said Stack Mode Signal, and delaying said sequence of hardwired instructions before said sequence advances to said decode section of said pipeline structure with said hold stack signal.

10. A method of processing hardwired instructions in a data processing system, as recited in claim 6, further comprising:
monitoring said execution processing unit, said data bus, said instruction bus, and said storage unit, and
detecting conflicts of priority generated by said sequence of hardwired instructions.

11. A method of processing hardwired instructions in a data processing system, as recited in claim 6, further comprising:
executing a plurality of sequences of hardwired instructions in which execution of said hardwired instructions finishes in a sequence identical to said sequence in which said instructions are received by said execution processing unit.

12. A data processing system, as recited in claim 2, wherein:
said single pipeline structure comprises an instruction fetch section, an opcode/decode and read GPR/LS section, a storage address calculation section, a TLB/Directory and Data cache access section, a data bus activity section, an execution section, and an update GPR/LS section.

13. A data processing system, as recited in claim 2, wherein:
said execution processing unit comprises a plurality of instruction stacks for receiving said sequence of hardwired instructions from said instruction bus and a processor for processing said sequence of hardwired instructions from said plurality of instruction stacks, and
said instruction pre-processing unit alternately selects to process each of said sequence of hardwired instructions in said stack or non-stack processing mode.

14. A data processing system, as recited in claim 12, wherein:
said section execution time interval of each of said plurality of sections being of substantially identical time duration.

15. A data processing system, as recited in claim 13, wherein:
said single pipeline structure comprises an instruction fetch section, an opcode/decode and read GPR/LS section, a storage address calculation section, a TLB/Directory and Data cache access section, a data bus activity section, an execution section, and an update GPR/LS section.

16. A data processing system, as recited in claim 13, wherein:
said instruction pre-processing unit comprises means to generate global pipeline controls, said global pipeline controls including a Hold IR signal, a Stack Mode signal, and a Hold stack signal,
said instruction pre-processing unit comprises means to send said global pipeline controls to said execution processing unit from said instruction pre-processing unit,
said execution processing unit delays a hardwired instruction in a decode section of said pipeline structure when said execution processing unit receives said Hold IR signal,
said execution processing unit executes a hardwired instruction in said stack mode when said execution processing unit receives said Stack Mode signal, and
said execution processing unit delays said sequence of hardwired instructions before said sequence advances to said decode section of said pipeline structure when said execution processing unit receving said Hold stack signal.

17. A data processing system, as recited in claim 15, wherein:
said section execution time interval of each of said plurality of sections being of substantially identical time duration.

18. A data processing system, as recited in claim 16, wherein:
said single pipeline structure comprises an instruction fetch section, an opcode/decode and read GPR/LS section, a storage address calculation section, a TLB/Directory and Data cache access section, a data bus activity section, an execution section, and an update GPR/LS section.

19. A data processing system, as recited in claim 16, wherein:
said plurality of instruction stacks form an instruction queue, an instruction register, and an instruction stack,
said instruction queue buffers said execution processing unit from said instruction pre-processing unit,
said execution processing unit executes instructions in said stack mode when said processor receives instructions from said instruction stack, and
said execution processing unit executes instruction in said non-stack mode when said processor receives instructions from said instruction register or instruction queue.

20. A data processing system, as recited in claim 18, wherein:
said section execution time interval of each of said plurality of sections being of substantially identical time duration.

21. A data processing system, as recited in claim 19, wherein:
said instruction pre-processing means further comprises monitoring means for monitoring said execution processing unit, said data bus, said instruction bus, and said storage unit, and
said monitoring means deflects conflicts of priority generated by said sequence of hardwired instructions.

22. A data processing system, as recited in claim 21, wherein:
said execution processing unit finishes said execution of said hardwired instructions in a sequence identical to said sequence of hardwired instructions received by said execution processing unit.

23. A data processing system for executing a sequence of instructions in such a manner as to improve performance, said data processing system comprises:
an execution processing unit for receiving said sequence of hardwired instructions,
an instruction pre-processing unit for independently receiving said sequence of hardwired instructions,
at least one storage unit for storing said sequence of hardwired instructions and from which said execution processing unit and said instruction pre-processing unit receive said sequence of hardwired instructions,
an instruction bus connected to said execution processing unit, said instruction pre-processing unit, and said storage unit for carrying said sequence of hardwired instructions to said execution processing unit and said instruction pre-processing unit from said storage unit, a data bus connected to said execution processing unit for carrying storage data from said storage unit to said execution processing unit, said execution processing unit executing said sequence of hardwired instructions in conjunction with said storage data, said execution processing unit executing each of said sequence of hardwired instructions in a pipeline structure, said sequence of instructions comprising a first and second group of hardwired instructions, each instruction in said first group of hardwired instructions having a single pipeline structure, said second group of hardwired instructions having a plurality of pipeline structures, said single pipeline structure and said plurality of pipeline structures comprising a plurality of sections, each section being executed by said execution processing unit in a single section execution time interval, each of said plurality of pipeline structures comprising a different minimum number of said sections, said single pipeline structure having a minimum number of said sections, said executing processing unit having at least a stack and non-stack processing mode, said execution processing unit executing said sequence of hardwired instructions and said instruction pre-processing unit selecting a processing mode for each hardwired instruction in said second group, said pipeline structure for each instruction executed minimizes total execution time for said sequence of hardwired instructions by eliminating unused sections of pipeline structure, said first group of hardwired instructions being executed in conjunction with storage data, said storage data received by said execution processing unit from said data bus before said data processing system completely processes said sequences of hardwired instructions, said second group of hardwired instructions executed independently from said data bus, said execution processing unit executing said hardwired instructions from said first group in said stack mode, said execution processing unit executing said hardwired instructions from said second group in said non-stack mode, said execution processing unit sequentially and concurrently executes each section of said sequence of hardwired instructions, and said execution processing unit executes each of said plurality of sections for each hardwired instruction in said sequence of hardwired instructions independently from all other sections and said execution processing unit executes different sections for each hardwired instruction during said section execution time interval.

24. A data processing system, as recited in claim 23, wherein:

said execution processing unit comprises a plurality of instruction stacks for receiving said sequence of hardwired instructions from said instruction bus and a processor for processing said sequence of hardwired instructions from said plurality of instruction stacks, and said instruction pre-processing unit alternately selects to process each of said sequence of hardwired instructions in said stack mode or in said non-stack mode.

25. A data processing system, as recited in claim 24, wherein:

said single pipeline structure comprises an instruction fetch section, an opcode/decode and read GPR/LS section, a storage address calculation section, a TLB/Directory and Data cache access section, a data bus activity section, an execution section, and an update GPR/LS section.

26. A data processing system, as recited in claim 24, wherein:

said instruction pre-processing unit comprises means to generate global pipeline controls, said global pipeline controls including a Hold IR signal, a Stack Mode signal, and a Hold stack signal, said instruction pre-processing unit comprises means to send said global pipeline controls to said execution processing unit from said instruction pre-processing unit, said execution processing unit delays a hardwired instruction in a decode section of said pipeline structure when said execution processing unit receives said Hold IR signal, said execution processing unit executes a hardwired instruction in said stack mode when said execution processing unit receives said Stack Mode signal, and said execution processing unit delays said sequence of hardwired instructions before said sequence advances to said decode section of said pipeline structure when said execution processing unit reeving said Hold stack signal.

27. A data processing system, as recited in claim 25, wherein:

said section execution time interval of each of said plurality of sections being of substantially identical time duration.

28. A data processing system, as recited in claim 26, wherein:

said single pipeline structure comprises an instruction fetch section, an opcode/decode and read GPR/LS section, a storage address calculation section, a TLB/Directory and Data cache access section, a data bus activity section, an execution section, and an update GPR/LS section.

29. A data processing system, as recited in claim 26, wherein:

said plurality of instruction stacks form an instruction queue, an instruction register, and an instruction stack, said instruction queue buffers said execution processing unit from said instruction pre-processing unit, said execution processing unit executes instructions in said stack mode when said processor receives instructions from said instruction stack, and said execution processing unit executes instruction in said non-stack mode when said processor receives instructions from said instruction register or instruction queue.

30. A data processing system, as recited in claim 28, wherein:

said section execution time interval of each of said plurality of sections being of substantially identical time duration.

31. A data processing system, as recited in claim 29, wherein:
said instruction pre-processing means further comprises monitoring means for monitoring said execution processing unit, said data bus, said instruction bus, and said storage unit, and
said monitoring means deflects conflicts of priority generated by said sequence of hardwired instructions.

32. A data processing system, as recited in claim 31, wherein:
said execution processing unit finishes said execution of said hardwired instructions in a sequence identical to said sequence of hardwired instructions received by said execution processing unit.

33. A method of processing hardwired instructions in a data processing system, as recited in claim 7, further comprising:
receiving said hardwired instructions from at least an instruction queue and an instruction register,
buffering said execution processing unit from said instruction pre-processing unit,
executing said instructions from said instruction queue in said first processing mode, and
executing said instructions from said instruction register in said second processing mode.

34. A method of processing hardwired instructions in a data processing system, as recited in claim 8, further comprising:
controlling said execution with global pipeline controls, said global pipeline controls comprising a Hold IR signal, a Stack Mode signal, and a Hold stack signal,
delaying a hardwired instruction in a decode section of said pipeline structure with said Hold IR signal,
switching between said first and second processing modes in said decode section of said pipeline structure with said Stack Mode Signal, and
delaying said sequence of hardwired instructions before said sequence advances to said decode section of said pipeline structure with said hold stack signal.

35. A method of processing hardwired instructions in a data processing system, as recited in claim 33, further comprising:
controlling said execution with global pipeline controls, said global pipeline controls comprising a Hold IR signal, a Stack Mode signal, and a Hold stack signal,
delaying a hardwired instruction in a decode section of said pipeline structure with said Hold IR signal,
switching between said first and second processing modes in said decode section of said pipeline structure with said Stack Mode Signal, and
delaying said sequence of hardwired instructions before said sequence advances to said decode section of said pipeline structure with said hold stack signal.

36. A method of processing hardwired instructions in a data processing system, as recited in claim 35, further comprising:
monitoring said execution processing unit, said data bus, said instruction bus, and said storage unit, and
detecting conflicts of priority generated by said sequence of hardwired instructions.

37. A method of processing hardwired instructions in a data processing system, as recited in claim 36, further comprising:
executing a plurality of sequences of hardwired instructions in which execution of said hardwired instructions finishes in a sequence identical to said sequence in which said instructions are received by said execution processing unit.

38. A method of processing hardwired instructions in a data processing system, as recited in claim 34, further comprising:
monitoring said execution processing unit, said data bus, said instruction bus, and said storage unit, and
detecting conflicts of priority generated by said sequence of hardwired instructions.

39. A method of processing hardwired instructions in a data processing system, as recited in claim 38, further comprising:
executing a plurality of sequences of hardwired instructions in which execution of said hardwired instructions finishes in a sequence identical to said sequence in which said instructions are received by said execution processing unit.

* * * * *

UNITED STATES PATENT AND TRADEMARK OFFICE
CERTIFICATE OF CORRECTION

PATENT NO. : 5,099,421

DATED : March 24, 1992

INVENTOR(S) : Daniel J. Buerkle and Agnes Y. Ngai

It is certified that error appears in the above-identified patent and that said Letters Patent is hereby corrected as shown below:

IN THE ABSTRACT:

line 6    Delete "sasme" and insert therefor --same--.

IN THE CLAIMS:

Col. 22, line 34    Delete "reeving" and insert therefor --receives--.

Signed and Sealed this

First Day of June, 1993

Attest:

MICHAEL K. KIRK

*Attesting Officer*      *Acting Commissioner of Patents and Trademarks*

UNITED STATES PATENT AND TRADEMARK OFFICE
CERTIFICATE OF CORRECTION

PATENT NO. : 5,099,421

DATED : 3/24/92

INVENTOR(S) : D. J. Buerkle et al

It is certified that error appears in the above-identified patent and that said Letters Patent is hereby corrected as shown below:

Column 17:

Claim 6, line 20 - delete "proceeding" and insert --processing--.

Claim 7, line 55 - delete "proceeding" and insert --processing--.

Signed and Sealed this

Eighth Day of March, 1994

Attest:

Attesting Officer

BRUCE LEHMAN

Commissioner of Patents and Trademarks